(12) United States Patent
Hong

(10) Patent No.: US 10,248,503 B2
(45) Date of Patent: Apr. 2, 2019

(54) DATA STORAGE DEVICE AND OPERATING METHOD THEREOF

(71) Applicant: SK hynix Inc., Gyeonggi-do (KR)

(72) Inventor: Ji Man Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 53 days.

(21) Appl. No.: 15/484,941

(22) Filed: Apr. 11, 2017

(65) Prior Publication Data

US 2018/0181460 A1   Jun. 28, 2018

(30) Foreign Application Priority Data

Dec. 28, 2016  (KR) .................. 10-2016-0180948

(51) Int. Cl.
*G06F 11/10* (2006.01)
*G06F 3/06* (2006.01)

(52) U.S. Cl.
CPC ................. *G06F 11/1072* (2013.01)

(58) Field of Classification Search
CPC .... G06F 11/1048; G06F 3/0604; G06F 3/065; G06F 3/0659; G06F 3/0688
See application file for complete search history.

(56) References Cited

U.S. PATENT DOCUMENTS

| | | | | |
|---|---|---|---|---|
| 8,661,301 B1* | 2/2014 | Yen | .......... | G11C 16/22 711/103 |
| 8,705,276 B2* | 4/2014 | Lee | .......... | G11C 16/06 365/185.03 |
| 9,547,574 B2* | 1/2017 | Meir | .......... | G06F 11/1441 |
| 2009/0059662 A1* | 3/2009 | Woo | .......... | G11C 16/0483 365/185.03 |
| 2010/0005229 A1* | 1/2010 | Hsiao | .......... | G06F 11/141 711/103 |
| 2013/0132651 A1* | 5/2013 | Li | .......... | G06F 12/0246 711/103 |
| 2013/0304966 A1* | 11/2013 | Joo | .......... | G06F 12/0246 711/103 |
| 2013/0311710 A1* | 11/2013 | Yang | .......... | G06F 12/0246 711/103 |
| 2014/0156918 A1* | 6/2014 | Choi | .......... | G06F 12/0246 711/103 |
| 2014/0215135 A1* | 7/2014 | Park | .......... | G06F 3/0679 711/103 |
| 2014/0223084 A1* | 8/2014 | Lee | .......... | G06F 12/0246 711/103 |
| 2014/0304456 A1* | 10/2014 | Narasimha | .......... | G06F 12/0246 711/103 |

(Continued)

FOREIGN PATENT DOCUMENTS

KR   1020090117761   11/2009
KR   1020130128685   11/2013

*Primary Examiner* — Kyle Vallecillo
(74) *Attorney, Agent, or Firm* — IP & T Group LLP

(57) ABSTRACT

A data storage device includes a nonvolatile memory device including a first page group coupled to a first word line and a second page group coupled to a second word line, which is subsequent to the first word line in order of a write operation; and a controller suitable for, after an abnormal power-off during a write operation to the first page group, copying a first data stored in a weak page of the first page group to a stable page of the second page group when a first error correction operation to data stored in the first page group is a success.

19 Claims, 14 Drawing Sheets

(56) References Cited

U.S. PATENT DOCUMENTS

| | | | |
|---|---|---|---|
| 2014/0304560 A1* | 10/2014 | Narasimha | G06F 11/0727 714/704 |
| 2015/0103599 A1* | 4/2015 | Kim | G11C 16/26 365/185.12 |
| 2018/0032283 A1* | 2/2018 | Park | G06F 3/0619 |

* cited by examiner

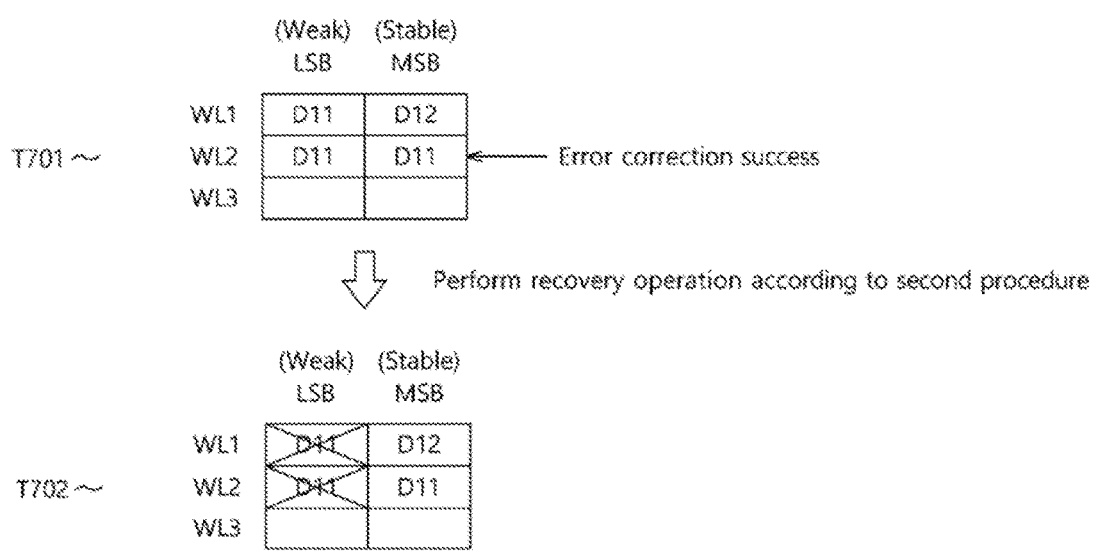

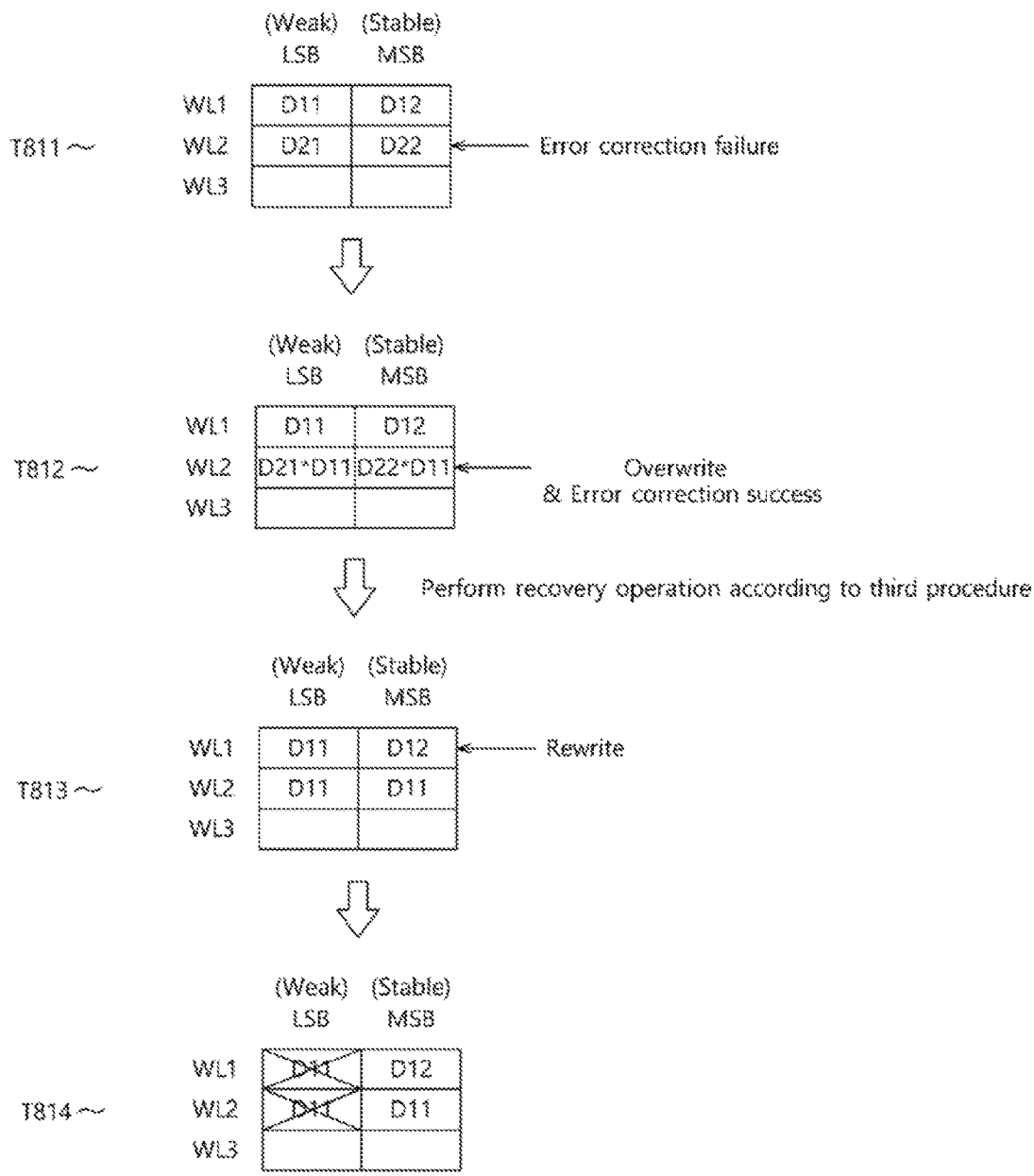

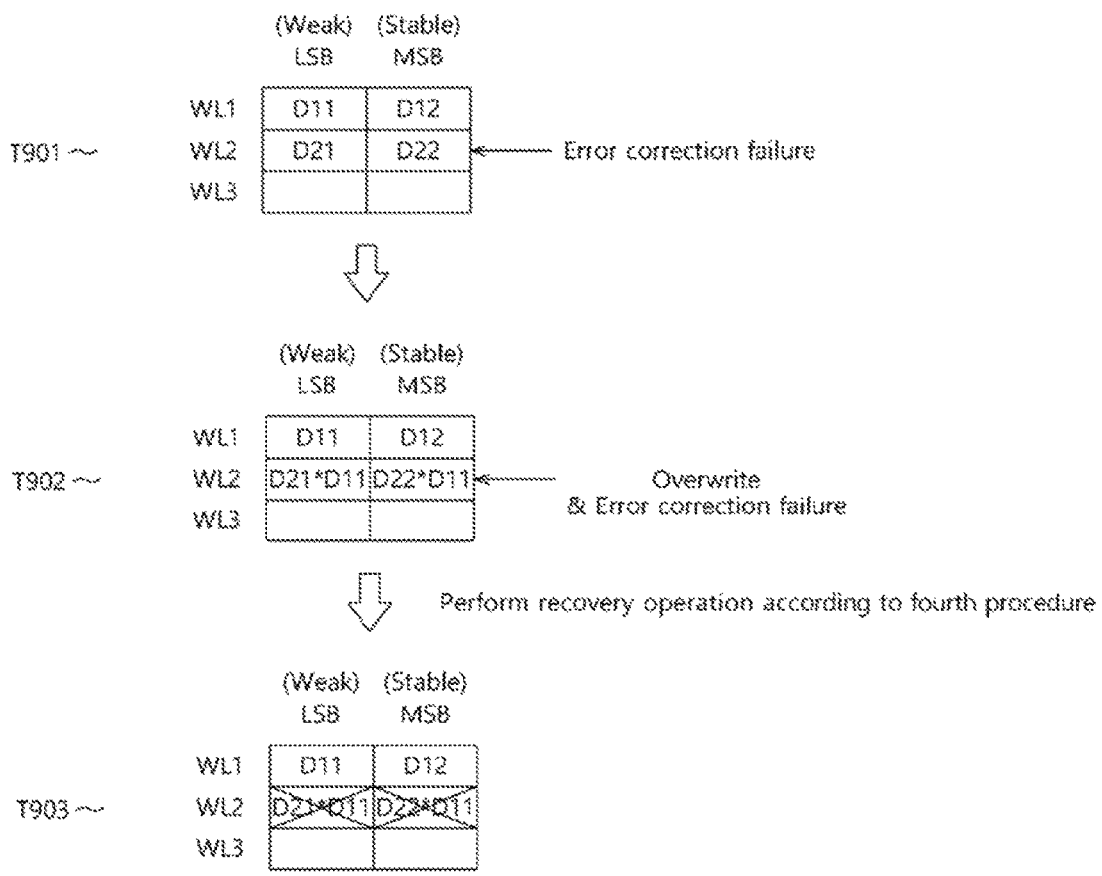

DATA STORAGE DEVICE AND OPERATING METHOD THEREOF

CROSS-REFERENCES TO RELATED APPLICATION

The present application claims priority under 35 U.S.C. § 119(a) to Korean application number 10-2016-0180948, filed on Dec. 28, 2016, in the Korean Intellectual Property Office, which is incorporated herein by reference in its entirety.

BACKGROUND

1. Technical Field

Various embodiments generally relate to a data storage device, and more particularly, to a data storage device including a nonvolatile memory device.

2. Related Art

Data storage devices may store data provided by an external device in response to a write request. Data storage devices may also provide stored data to an external device in response to a read request. Examples of external devices that use data storage devices include desktop, portable and mobile electronic devices including computers, digital cameras, cellular phones, smart phones, smart cards, and the like. Data storage devices may be embedded in an external device during manufacturing of the external devices or may be fabricated separately and then connected afterwards to an external device.

SUMMARY

In an embodiment, a data storage device may include: a nonvolatile memory device including a first page group coupled to a first word line and a second page group coupled to a second word line, which is subsequent to the first word line in order of a write operation; and a controller suitable for, after an abnormal power-off during or after a write operation to the first page group, copying a first data stored in a weak page of the first page group to a stable page of the second page group when a first error correction operation to data stored in the first page group is a success.

In an embodiment, a method for operating a data storage device may include: copying a first data stored in a weak page of a first page group to a stable page of a second page group when a first error correction operation to data stored in the first page group is a success, after an abnormal power-off during or after a write operation to the first page group, wherein the data storage device includes a nonvolatile memory device including the first page group coupled to a first word line and the second page group coupled to a second word line, which is subsequent to the first word line in order of a write operation.

In an embodiment, a data storage device may include: a nonvolatile memory device including a first page group coupled to a first word line, a second page group coupled to a second word line which is subsequent to the first word line in order of a write operation and a third page group coupled to a third word line which is previous to the first word line in order of the write operation; and a controller suitable for, after an abnormal power-off during or after a write operation to the first page group, copying a first data stored in a weak page of the first page group to a stable page of the second page group depending on whether a second data stored in a stable page of the first page group is the same as a third data stored in a weak page of the third page group, when an error correction operation to data stored in the first page group is a success.

BRIEF DESCRIPTION OF THE DRAWINGS

The above and other features and advantages of the present invention will become more apparent to those skilled in the art to which the present invention belongs by describing various embodiments thereof with reference to the attached drawings in which:

FIGS. 6A to 9 are diagrams illustrating methods of a recovery unit to perform a recovery operation according to first to fourth procedures in accordance with the embodiment.

DETAILED DESCRIPTION

Figure 1:
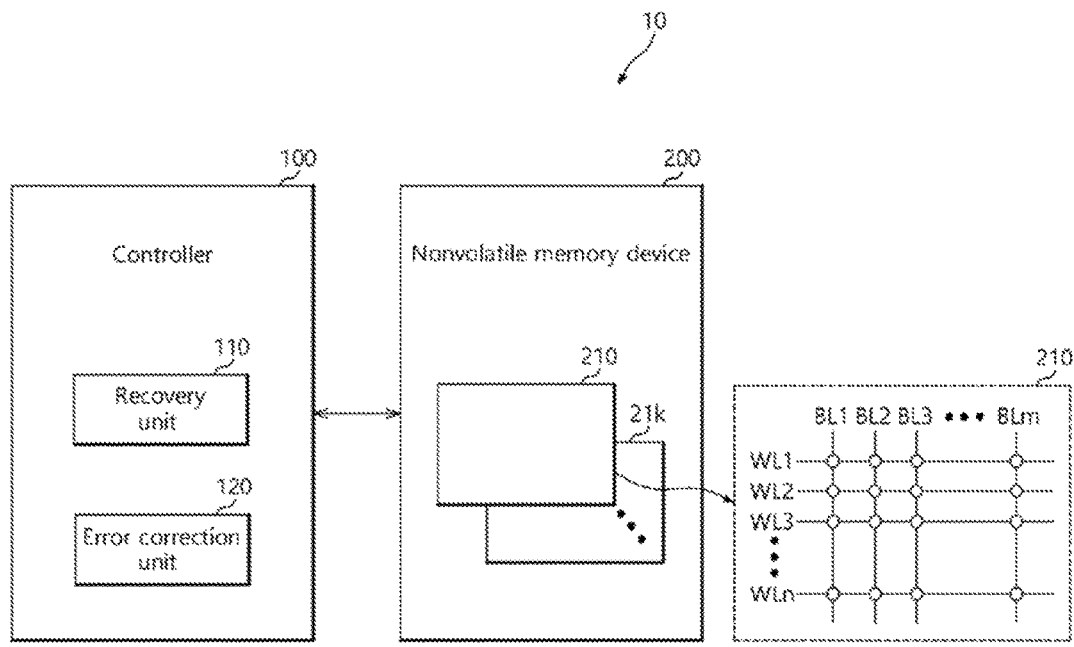
FIG. 1 is a block diagram illustrating a data storage device in accordance with an embodiment.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a data storage device 10 in accordance with an embodiment.

The data storage device 10 may store data provided from an external device in response to a write request from the external device. Additionally, the data storage device 10 may provide stored data to the external device in response to a read request from the external device.

The data storage device 10 may be in the form of a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

The data storage device 10 may include a controller 100 and a nonvolatile memory device 200.

The controller 100 may control general operations of the data storage device 10. The controller 100 may store data in the nonvolatile memory device 200 in response to a write request transmitted from the external device, and may read data stored in the nonvolatile memory device 200 and output read data to the external device in response to a read request transmitted from the external device.

The controller 100 may include a recovery unit 110 and an error correction unit 120.

The recovery unit 110 may detect occurrence of an abnormal power-off when power supply is restored after the abnormal power-off occurred, and perform a recovery operation for a target word line, to which a write operation is performed last in any one memory block 210 among memory blocks 210 to 21k. Even though an abnormal power-off occurs, no problem is caused in a state in which the write operation for the target word line is completed already. However, if the write operation for the target word line is being performed the recovery operation may be needed.

During the recovery operation, when an error correction operation to the data stored in the pages of the target word line is a success, the recovery unit 110 may move the data stored in a weak page of the target word line to a stable page in preparation for a reoccurrence of an abnormal power-off. The weak page may be selected from pages of the target word line. The stable page may be selected from pages of a subsequent word line to which a write operation is to be performed after the target word line. The weak page and the stable page will be described in detail with reference to FIG. 4.

Furthermore, an abnormal power-off is likely to be repeated. For example, while copying the data from a weak page to a stable page through a recovery operation, an abnormal power-off may occur again. Therefore, according to an embodiment, if an error correction operation to the data stored in the pages of a target word line is a success, the recovery unit 110 may determine whether a write operation to the target word line at the time of the abnormal power-off that is, an operation of storing the data to be the subject of the error correction operation when the power supply is restored is a normal write operation which has nothing to do with a recovery operation or a copy operation during a recovery operation, and perform a recovery operation through different procedures depending on a result of the determination. The corresponding procedures will be described below in detail as a first procedure and a second procedure, respectively.

According to the descriptions made heretofore, it is when an error correction operation for the data stored in the weak pages of a previous target word line succeeds that a copy operation may be performed to the stable page of a subsequent word line during a recovery operation. In this regard, since an abnormal power-off interrupts one of the normal write operation and the copy operation that are being performed for a target word line, consideration should be made even for the case in which a corresponding error correction operation fails.

In the case in which an abnormal power-off interrupts the normal write operation and an error correction operation fails, an original data of the error-correction-failed data does not exist, and thus it may be impossible actually to recover the error-correction-failed data.

However, when an abnormal power-off interrupts the copy operation to the stable page of the subsequent word line during the recovery operation and an error correction operation to data of the stable page fails, data for which the error correction operation fails that is, data of the stable page may have a possibility to be recovered. Further, an original data of the error-correction-failed data is stored in the weak page of a previous target word line, and thus a recovery operation may be performed using the original data since the copy operation during the recovery operation is performed when the error correction operation to the original data stored in the weak pages of the previous target word line succeeds.

Therefore, if an error correction operation to the data stored in the pages of a target word line is a failure, the recovery unit 110 may determine which one of a copy operations included in a recovery operation and a normal write operation is being performed when an abnormal power-off occurs, and perform a recovery operation through different procedures depending on a result of the determination. The corresponding procedures will be described below in detail as a third procedure and a fourth procedure, respectively.

In summary, the recovery unit 110 may perform a recovery operation according to any one of the first to fourth procedures, which are to be performed under the following situations, respectively.

The first procedure may be performed under a situation where a normal write operation is being performed for a target word line when an abnormal power-off occurs and an error correction operation to the data stored in the pages of the target word line is a success after the abnormal power-off.

The second procedure may be performed under a situation where a copy operation is being performed to the stable page of a subsequent target word line when subsequent abnormal power-off occurs during a recovery operation and an error correction operation to the data stored in the stable pages of the subsequent target word line at the time of the subsequent abnormal power-off is a success after the subsequent abnormal power-off.

The third procedure may be performed under a situation where a copy operation is being performed to the stable page of the subsequent target word line when subsequent abnormal power-off occurs during a recovery operation and an error correction operation to the data stored in the stable pages of the subsequent target word line at the time of the subsequent abnormal power-off is a failure after the subsequent abnormal power-off.

The fourth procedure may be performed under a situation where a normal write operation is being performed for a target word line when an abnormal power-off occurs and an error correction operation to the data stored in the pages of the target word line is a failure after the abnormal power-off.

The respective first to fourth procedures may be performed during the recovery operation when a corresponding condition is met or a corresponding situation occurs.

The memory block 210 as a target of the recovery operation may be the one designated for a write operation among the memory blocks 210 to 21k at a time when an abnormal power-off occurs. For example, the controller 100 may designate one memory block 210 among the memory blocks 210 to 21k for the purpose of storing data transmitted from an external device, and perform a write operation sequentially to word lines WL1 to WLn of the memory block 210. However, according to an embodiment, two or more memory blocks may be designated simultaneously for the purpose of storing data transmitted from an external device.

As will be described later, the recovery unit 110 may perform a copy operation, an overwrite operation and a rewrite operation for a recovery operation. The copy operation may be performed to write the data of a specified page into an empty page. The overwrite operation may be performed to write the data of a specified page into another page in which data is stored already. The rewrite operation may be performed to write the data of a specified page into the same page.

In the present embodiment, the overwrite operation may be regarded as a copy operation resumed to the stable pages of the subsequent target word line to which an error correction operation fails after the copy operation to the stable page of the subsequent target word line is interrupted due to the subsequent abnormal power-off. That is, the overwrite operation may be performed for the third procedure described above. The error-correction-failed data of the stable pages of the subsequent target word line may be recovered through an overwrite operation with the original data stored in the weak page of the previous target word line.

The error correction unit 120 may perform an error correction operation for the data read from the nonvolatile memory device 200. The error correction unit 120 may correct the error bits included in data within the range of error correction capability according to an error correction algorithm. The error correction unit 120 may perform an error correction operation based on various error corrections algorithms known in the art.

The nonvolatile memory device 200 may store data transmitted from the controller 100 and may read stored data and transmit read-out data to the controller 100, according to control of the controller 100. The nonvolatile memory device 200 may include the memory blocks 210 to 21k. Each of the memory blocks 210 to 21k may include memory cells which are coupled to a plurality of word lines WL1 to WLn and a plurality of bit lines BL1 to BLm. Each of the word lines WL1 to WLn may correspond to a plurality of pages depending on the number of bits stored in each memory cell.

The nonvolatile memory device 200 may include a flash memory, such as a NAND flash or a NOR flash, a Ferro-electrics Random Access Memory (FeRAM), a Phase-Change Random Access Memory (PCRAM), a Magnetoresistive Random Access Memory (MRAM), a Resistive Random Access Memory (ReRAM), and the like.

While FIG. 1 illustrates one nonvolatile memory device 200, it is to be noted that the embodiment is not limited thereto.

Figure 2:
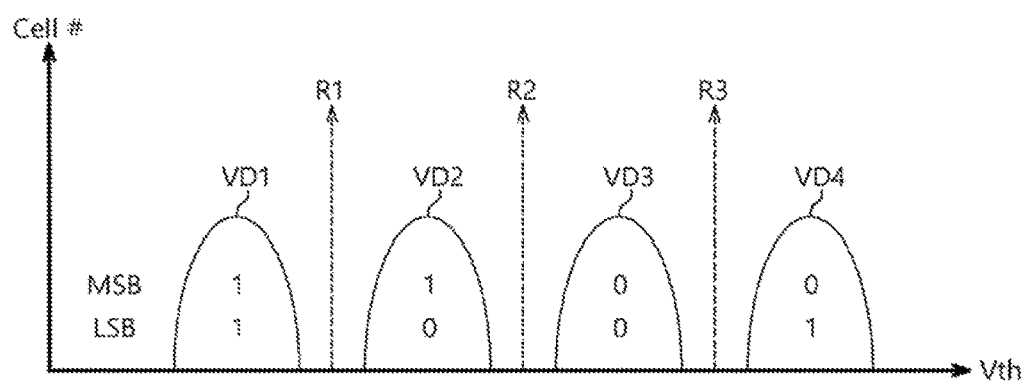
FIG. 2 is a diagram illustrating threshold voltage distributions of the memory cells included in the memory block of FIG. 1.

FIG. 2 is a diagram illustrating threshold voltage distributions VD1 to VD4 of the memory cells included in the memory block 210 of FIG. 1. The horizontal axis Vth may mean a threshold voltage of a memory cell, and the vertical axis Cell # may mean the number of memory cells corresponding to a threshold voltage.

Referring to FIG. 2, memory cells may form predetermined threshold voltage distributions VD1 to VD4 according to the data stored therein. Each memory cell may be controlled to have a threshold voltage corresponding to any one among the four threshold voltage distributions VD1 to VD4, depending on 2-bit data to be stored therein. The threshold voltage distributions VD1 to VD4 may correspond to data "11," "10," "00" and "01," respectively. Thus, for example, a memory cell stored with data "11" may have a threshold voltage corresponding to the threshold voltage distribution VD1. Two bits, that is, LSB data and MSB data, stored in memory cells may be stored in an LSB page and an MSB page, respectively.

Each memory cell may be turned on or off depending on a threshold voltage, when a predetermined read voltage is applied to a word line to which the memory cell is coupled. Furthermore, a memory cell may be turned on when a read voltage higher than its threshold voltage is applied, and may be turned off when a read voltage lower than its threshold voltage is applied. In this case, by sensing the current formed when a memory cell is turned on or off, it is possible to determine whether the threshold voltage of the memory cell is higher or lower than a read voltage. Therefore, threshold voltage distributions in which memory cells are positioned may be determined based on read voltages R1 to R3 which are positioned between the threshold voltage distributions VD1 to VD4. As a result, when a read operation is performed, data corresponding to a threshold voltage distribution in which a memory cell is positioned may be outputted.

Depending on from which page data is to be read, at least one read voltage selected among the read voltages R1 to R3 may be used. For example, an LSB page may be read based on the read voltages R1 and R3. An MSB page may be read based on the read voltage R2.

Figure 3:
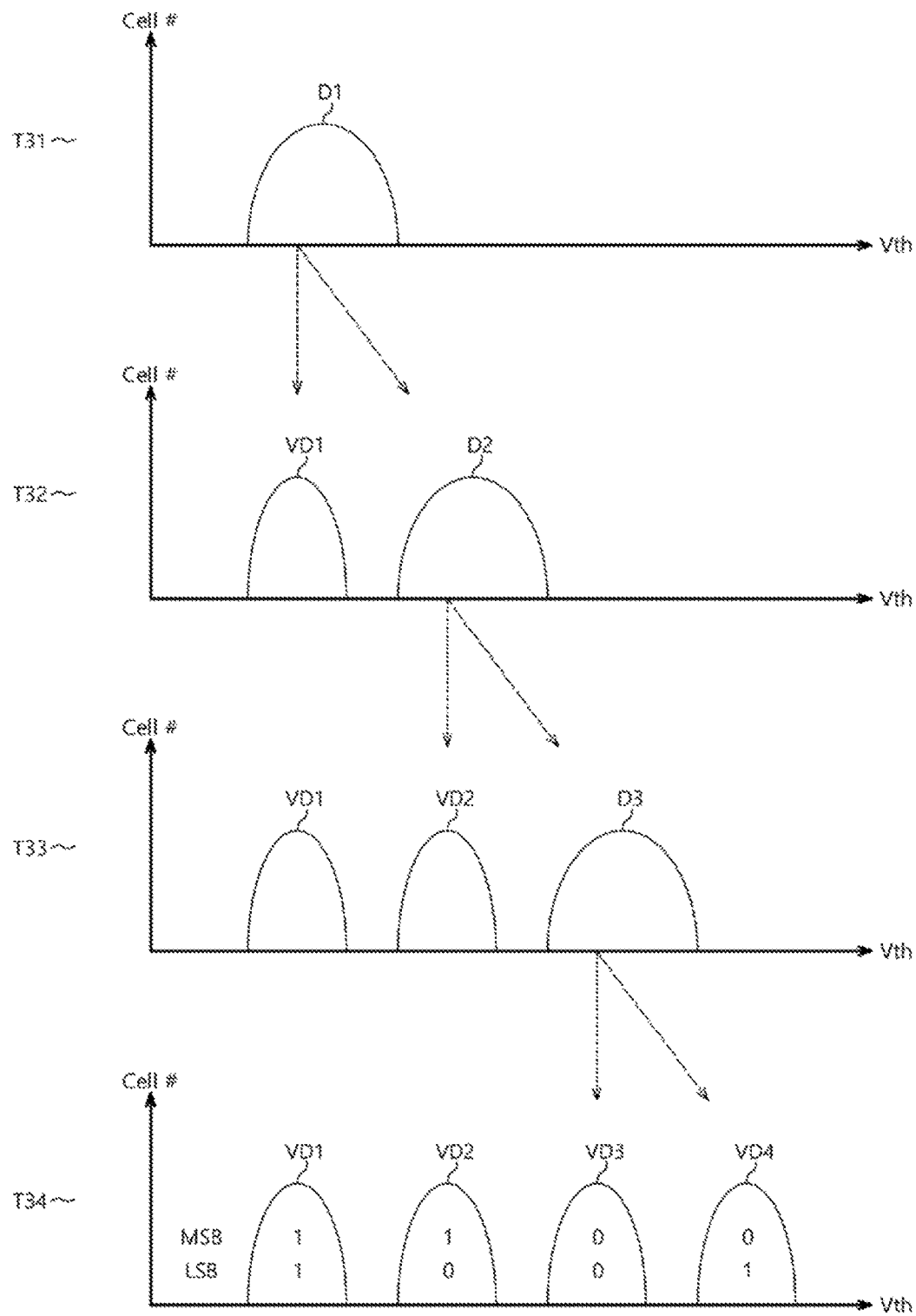
FIG. 3 is a diagram illustrating changes of threshold voltage distributions when a normal write operation is performed.

FIG. 3 is a diagram illustrating changes of threshold voltage distributions when a normal write operation is performed.

First, the controller 100 may store LSB and MSB data in LSB and MSB pages corresponding to one word line, through one normal write operation. The threshold voltage of a memory cell may be gradually raised by a plurality of write pulses applied to the memory cell, until the memory cell is positioned in a threshold voltage distribution corresponding to data to be stored therein.

For example, at a time T31, erased memory cells may form a threshold voltage distribution D1. At a time T32, if the controller 100 starts a normal write operation, some memory cells may form a threshold voltage distribution VD1, and remaining memory cells may form a threshold voltage distribution D2 by having increased threshold voltages. At a time T33, some memory cells of the threshold voltage distribution D2 may form a threshold voltage distribution VD2, and remaining memory cells may form a threshold voltage distribution D3 by having increased threshold voltages. At a time T34, some memory cells of the threshold voltage distribution D3 may form a threshold voltage distribution VD3, and remaining memory cells may form a threshold voltage distribution VD4 by having increased threshold voltages.

Here, it may be seen that, while the normal write operation is performed, data corresponding to a low threshold voltage distribution, for example, the threshold voltage distribution VD1, is stored earlier and data corresponding to a high threshold voltage distribution, for example, the threshold voltage distribution VD4, is stored later.

Figure 4:
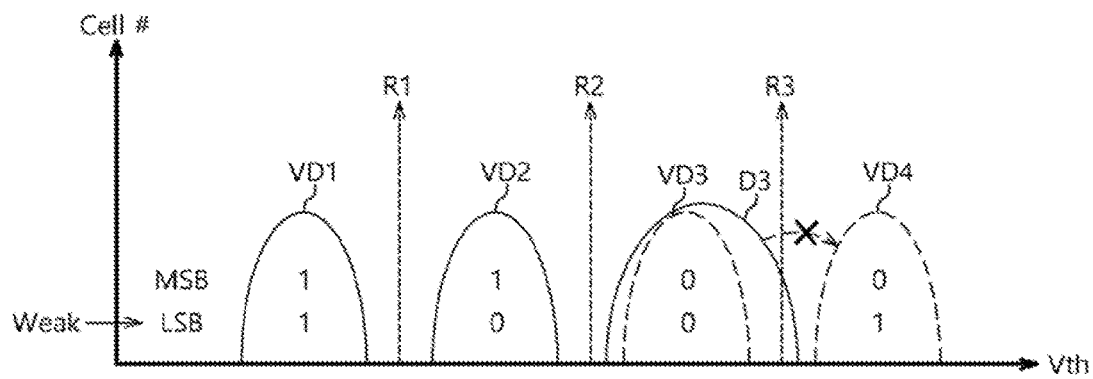
FIG. 4 is a diagram illustrating incomplete threshold voltage distributions due to an abnormal power-off.

FIG. 4 is a diagram illustrating incomplete threshold voltage distributions due to an abnormal power-off.

Referring to FIG. 4, when an abnormal power-off occurs while the normal write operation is performed, for example, the threshold voltage distribution D3 is divided into the threshold voltage distributions VD3 and VD4, memory cells may remain in a state in which the memory cells form incomplete threshold voltage distributions VD1, VD2 and D3. In this regard, it may be mentioned that data corresponding to the threshold voltage distributions VD1, VD2 and VD3 have been stored substantially and data corresponding to the threshold voltage distribution VD4 are not stored yet. When viewed from another viewpoint, it may be mentioned that MSB data have been stored substantially. The reason is that, since the threshold voltage distributions VD3 and VD4 correspond to the same MSB data "0," the MSB data "0" will not be changed even when the normal write operation is performed continuously without experiencing the abnormal power-off and thereby the threshold voltage distributions VD3 and VD4 are formed completely. However, it should be noted that, since the LSB data "0" is stored in memory cells which are to be stored with the LSB data "1" of the threshold voltage distribution VD4, the LSB data is not completely stored yet.

Thus, the LSB data is weak when an abnormal power-off occurs while performing a normal write operation, when compared to MSB data. Therefore, the weak page may be an LSB page, and a stable page may be an MSB page. A weak page may be a page in which data is read based on the highest read voltage R3 among the read voltages R1 to R3 used in a read operation. That is, a weak page may be a page which requires a longest time to completely store data when the pages of one word line are written simultaneously. A stable page may be selected among the pages of one word line other than the weak page. As will be described below, the weak page may be determined depending on which page is to be read by a highest read voltage.

Figure 5A:
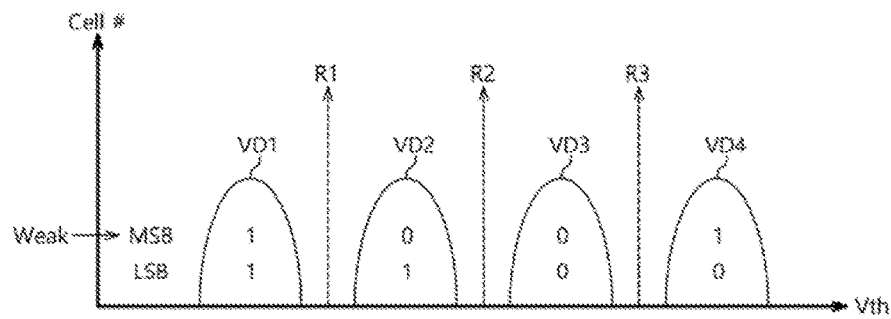
FIGS. 5A and 5B are diagrams illustrating methods for determining a weak page and a stable page in accordance with another embodiments.
Figure 5B:
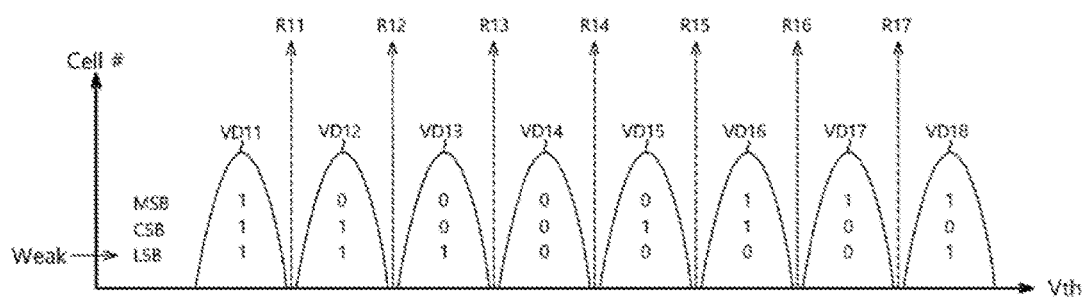

FIGS. 5A and 5B are diagrams illustrating methods for determining the weak page and the stable page in accordance with other embodiments.

In FIG. 5A, data corresponding to threshold voltage distributions VD1 to VD4 may be different from the data illustrated in FIG. 2. An LSB page may be read based on an LSB read voltage R2. An MSB page may be read based on MSB read voltages R1 and R3. Hence, the weak page may be the MSB page which is read based on the highest read voltage R3. The stable page may be the LSB page.

FIG. 5B illustrates eight threshold voltage distributions VD11 to VD18 of memory cells when 3-bit data is stored in each memory cell. The threshold voltage distributions VD11 to VD18 may correspond to data "111," "011," "001," "000," "010," "110," "100" and "101," respectively. One word line may correspond to respective LSB, CSB and MSB pages in which respective 3 bits that is, LSB, CSB and MSB data are stored.

Depending on from which page data is to be read, read voltages selected among read voltages R11 to R17 may be used. For example, an LSB page may be read based on LSB read voltages R13 and R17. A CSB page may be read based on CSB read voltages R12, R14 and R16. An MSB page may be read based on MSB read voltages R11 and R15. The weak page may be the LSB page which is read based on the highest read voltage R17. The stable page may be selected as any one of the CSB and MSB pages.

According to an embodiment, in order to evaluate weakness and stability of a page, various additional characteristics may be considered. For example, the weakness and stability of a page may be evaluated according to additional factors such as interference and disturbance effects induced among memory cells. For example, if an abnormal power-off occurs while performing the rewrite operation, the lowest threshold voltage distribution VD11 may move slightly towards a higher threshold voltage due to the characteristics of memory cells. When considering this effect, in FIG. 5B, it may be determined that the MSB page as a page read based on the lowest read voltage R11 may be weak to an abnormal power-off. Therefore, the CSB page may be determined to be more stable than the MSB page.

FIGS. 6A to 9 are diagrams illustrating methods of the recovery unit 110 which performs a recovery operation according to first to fourth procedures in accordance with the embodiment. FIGS. 6A to 9 illustrate LSB and MSB pages respectively corresponding to three word lines WL1 to WL3 included in the memory block 210.

For each of the word lines WL1 to WL3 of FIGS. 6A to 9, it is presumed that the LSB page is the weak page and the MSB page is the stable page with respect to an abnormal power-off. As described above, during the recovery operation, when an error correction operation to the data stored in the weak pages of the previous target word line is a success, the recovery unit 110 may copy the data stored in the weak page of the previous target word line to the stable page of the subsequent target word line in order to secure the data of the weak page from a possible abnormal power-off. Therefore, when a LSB data of the LSB page that is, the weak page is the same as a MSB data of the MSB page that is, the stable page, it may be determined that a copy operation was being performed to the stable page at the time of the subsequent abnormal power-off.

Further, in FIGS. 6A to 9, it is presumed that the word line WL2 is the target word line to which a write operation is last performed at the time of the abnormal power-off.

Figure 6A:
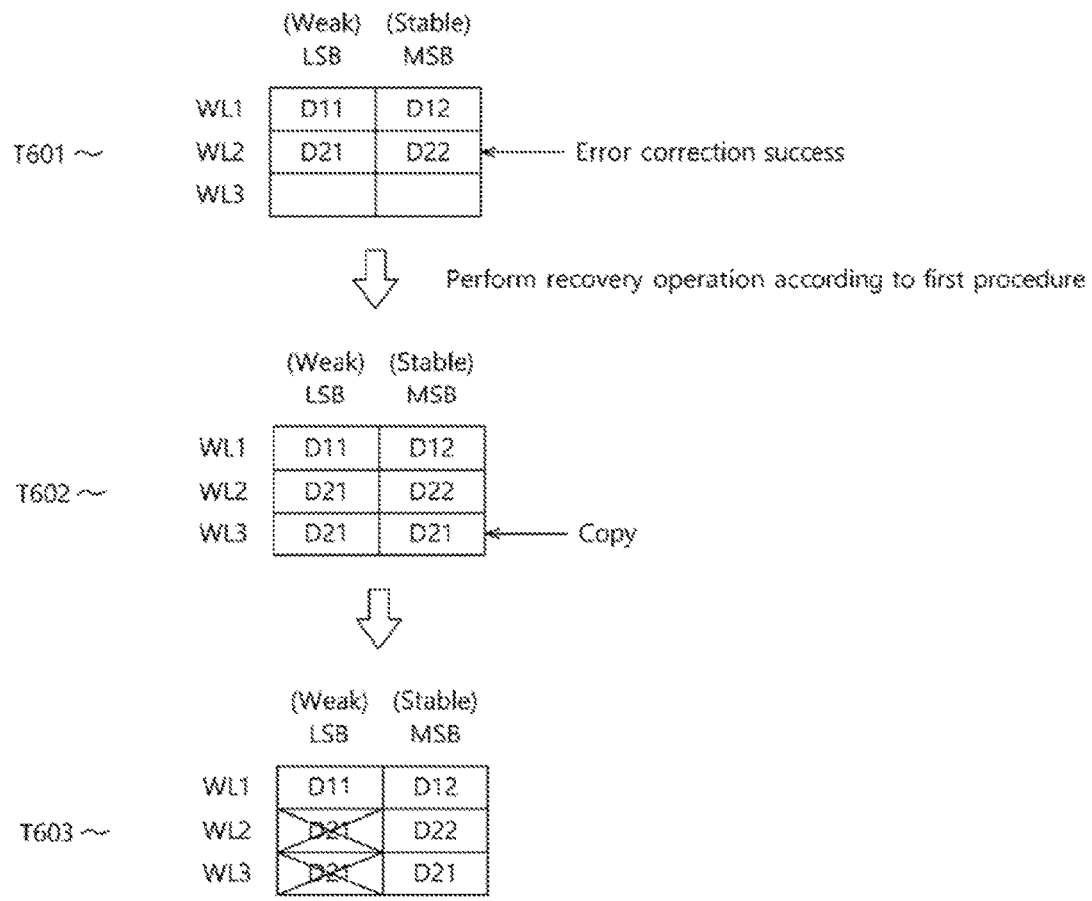

Referring to FIG. 6A, the recovery unit 110 may perform a recovery operation according to the first procedure.

In detail, at a time T601, the recovery unit 110 may determine that an error correction operation to LSB data D21 and MSB data D22 of the target word line WL2 is a success. Then, the recovery unit 110 may compare LSB data D11 of the word line WL1 and the MSB data D22 of the word line WL2, and determine that the LSB data D11 of the word line WL1 and the MSB data D22 of the word line WL2 do not correspond to each other. Therefore, the recovery unit 110 may determine that an abnormal power-off has occurred while a normal write operation was being performed to the LSB and MSB pages of the word line WL2, and may determine to perform the recovery operation according to the first procedure.

Thus, at a time T602, the recovery unit 110 may copy the data of the weak page, that is, the LSB data D21 of the word line WL2, to a stable page, that is, the MSB page of the word line WL3. Further, the recovery unit 110 may copy the LSB data D21 of the word line WL2 to the LSB page of the word line WL3. However, according to another embodiment, the recovery unit 110 may write arbitrary dummy data in the LSB page of the word line WL3. According to another embodiment, the recovery unit 110 may leave the LSB page of the word line WL3 as an empty page. In the examples illustrated in FIGS. 6A to 9, a copy operation is performed by copying the data of a weak page to not only the stable page of a next word line but also to remaining pages of the next word line.

At a time T603, the recovery unit 110 may invalidate the LSB data D21 of the word lines WL2 and WL3.

As a consequence, the data D21 of the LSB page (i.e., the weak page) of the word line WL2 may be copied to the MSB page (i.e., the stable page) of the word line WL3 thereby securing the data of the weak page from a possible abnormal power-off.

Figure 6B:
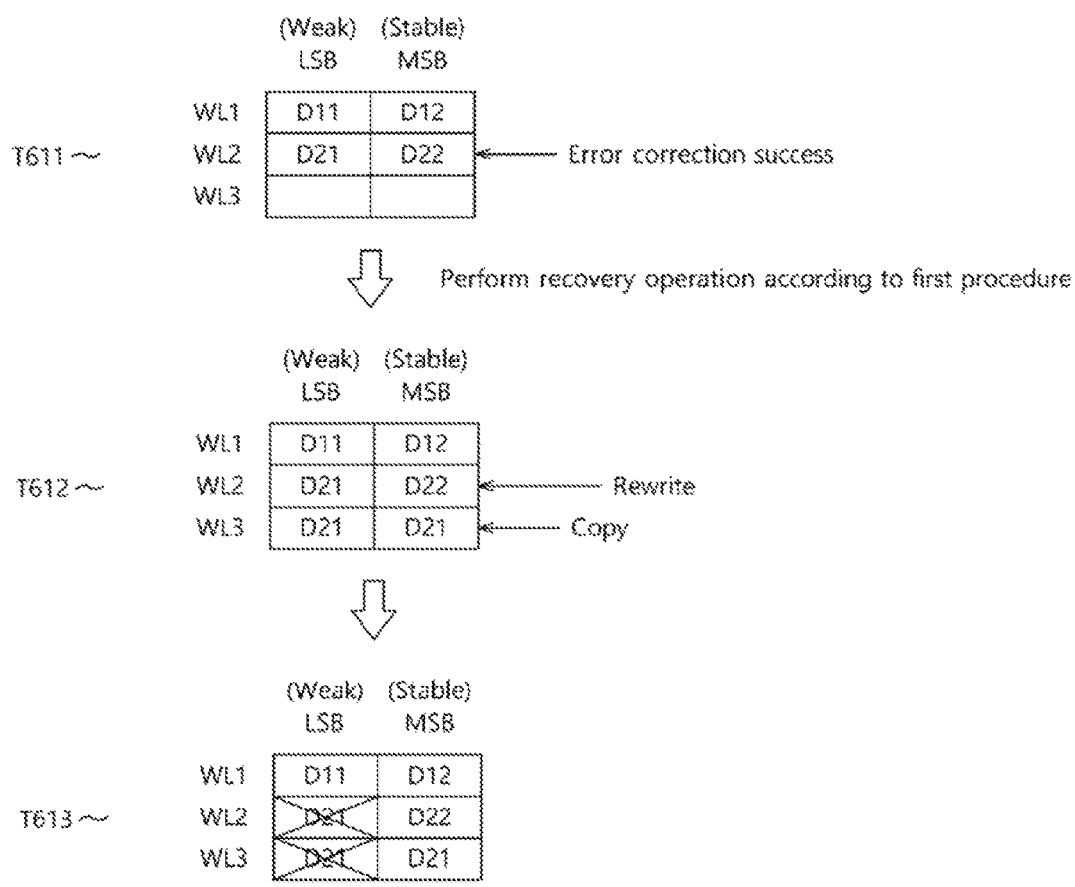

Referring to FIG. 6B, according to an embodiment, at a time T612, the recovery unit 110 may additionally perform a rewrite operation to the LSB and MSB pages of the word line WL2. Even though the error correction operation to the LSB data D21 and the MSB data D22 of the word line WL2 is a success, the LSB data D21 and the MSB data D22 might have been influenced by the abnormal power-off. Thus, the rewrite operation may be performed to secure margins between the threshold voltage distributions of memory cells and allow the LSB data D21 and the MSB data D22 of the word line WL2 to be stored more stably.

According to an embodiment, the rewrite operation may not be performed to the LSB page of the word line WL2 which is to be finally invalidated. That is, the rewrite operation may be performed for only a stable page to be finally retained, that is, the MSB page of the word line WL2.

The rewrite operation may be performed for securement of the data D21 of the weak page after copying the LSB data D21 of the LSB page (i.e., the weak page) of the word line WL2 to the MSB page (i.e., the stable page) of the word line WL3 and before invalidating the LSB data D21 of the word lines WL2 and WL3.

Since the procedure shown in FIG. 6B is the same as the procedure shown in FIG. 6A except that the rewrite operation is performed additionally, detailed descriptions thereof will be omitted herein.

Referring to FIG. 7A, the recovery unit 110 may perform a recovery operation according to the second procedure.

In detail, at a time T701, the recovery unit 110 may determine that an error correction operation to LSB data D11 and MSB data D11 of the target word line WL2 is a success. Then, the recovery unit 110 may compare LSB data D11 of the word line WL1 and the MSB data D11 of the word line WL2, and determine that the LSB data D11 of the word line WL1 and the MSB data D11 of the word line WL2 correspond to each other. Therefore, the recovery unit 110 may determine that a previous abnormal power-off occurred while a normal write operation was being performed to the LSB and MSB pages of the word line WL1 that is, the previous target word line and also a subsequent abnormal power-off has occurred while a copy operation was being performed to the LSB and MSB pages of the word line WL2 that is, the subsequent target word line during a recovery operation. Hence, the recovery unit 110 may determine to perform the recovery operation according to the second procedure.

Since the error correction operation to the LSB data D11 and the MSB data D11 of the word line WL2 is a success, the recovery operation according to the second procedure may be completed by simply invalidating redundant data. That is, at a time T702, the recovery unit 110 may invalidate the LSB data D11 of the word lines WL1 and WL2.

As a consequence, the data D11 of the LSB page (i.e., the weak page) of the word line WL1 may be copied to the MSB page (i.e., the stable page) of the word line WL2 thereby securing the data of the weak page from a possible abnormal power-off.

Figure 7B:
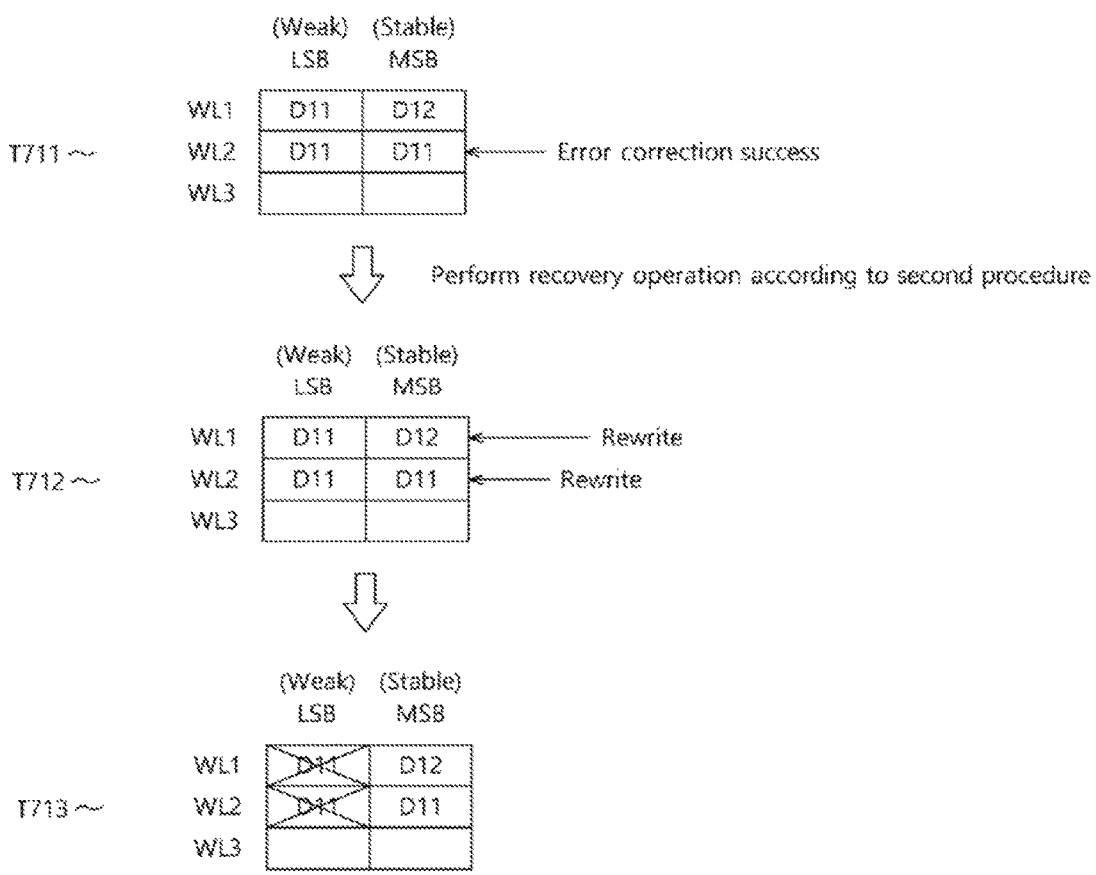

Referring to FIG. 7B, according to an embodiment, at a time T712, the recovery unit 110 may additionally perform a rewrite operation to the LSB and MSB pages of the word line WL2. The rewrite operation may be performed to ensure that the LSB data D11 and the MSB data D11 of the word line WL2 to which the copy operation is interrupted due to the subsequent abnormal power-off are stored more stably.

According to an embodiment, the rewrite operation may not be performed to the LSB page of the word line WL2 which is to be finally invalidated. The rewrite operation may be performed for only a stable page to be finally retained, that is, the MSB page of the word line WL2.

The recovery unit 110 may additionally perform a rewrite operation to the LSB and MSB pages of the word line WL1. The rewrite operation may be performed to ensure that the LSB data D11 and MSB data D12 of the word line WL1 to which the normal write operation is interrupted due to the abnormal power-off, are stored more stably.

According to an embodiment, the rewrite operation may not be performed to the LSB page of the word line WL1 which is to be finally invalidated. The rewrite operation may be performed for only a stable page to be finally retained, that is, the MSB page of the word line WL1.

The rewrite operations may be performed to the word lines WL1 and WL2 before invalidating the LSB data d11 of the word lines WL1 and WL2. The rewrite operation may be performed to the word line WL2 earlier than the rewrite operation to the word line WL1.

Figure 8A:
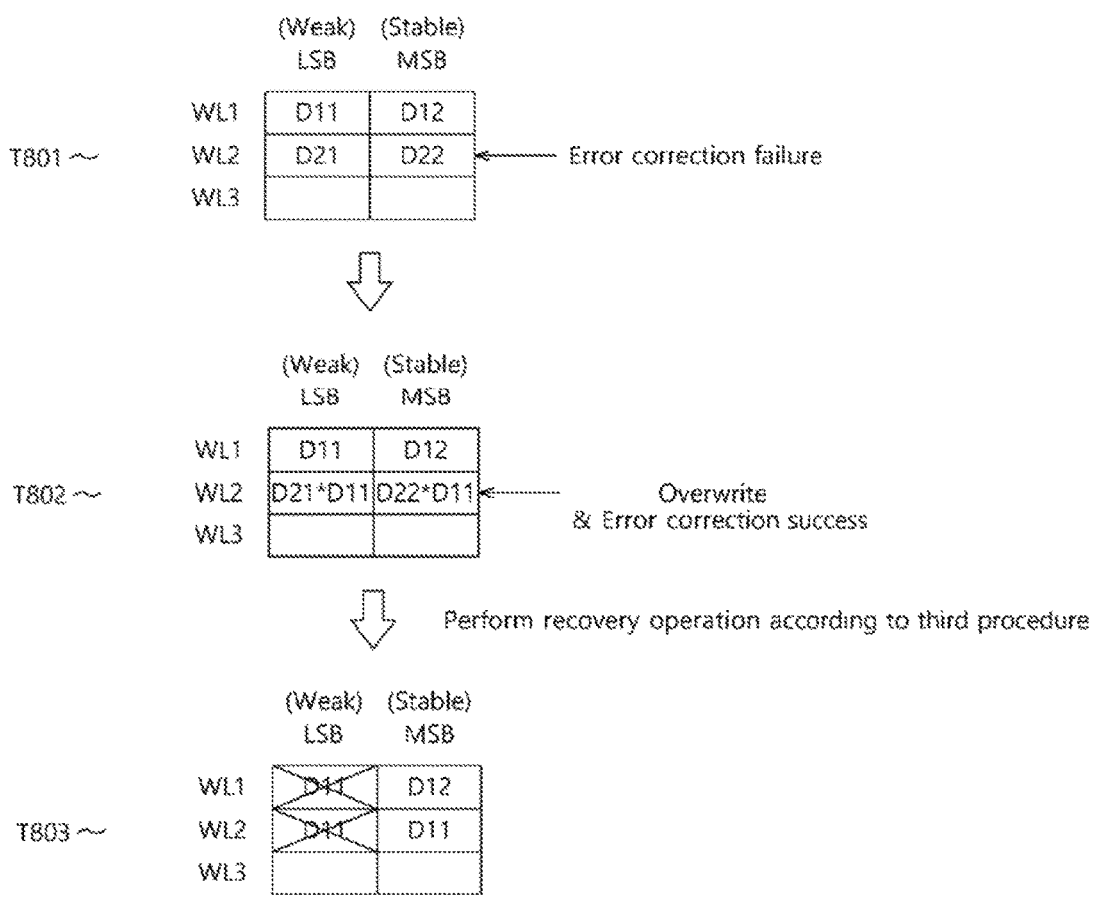

Referring to FIG. 8A, the recovery unit 110 may perform a recovery operation according to the third procedure.

In detail, at a time T801, the recovery unit 110 may determine that an error correction operation to LSB data D21 and MSB data D22 of the target word line WL2 is a failure.

Then, at a time T802, the recovery unit 110 may overwrite LSB data D11 of the word line WL1 to the LSB and MSB pages of the word line WL2. Thereafter, the recovery unit 110 may determine whether or not an error correction operation to the overwritten LSB data D21*D11 and MSB data D22*D11 of the word line WL2 is a success. When the error correction operation to the overwritten LSB data D21*D11 and MSB data D22*D11 of the word line WL2 is determined to be a success, it may be determined that a copy operation was being performed to the stable page (i.e., the MSB page) of the subsequent target word line (i.e., the word line WL2) at the time of the abnormal power-off. Therefore, the overwrite operation may be regarded as a resumed copy operation. That is, the overwrite operation may induce a result of copying the LSB data D11 of the weak page of the word line WL1 that is, the previous target word line to the MSB page that is, the stable page of the word line WL2 that is, the subsequent target word line.

In summary, when the error correction operation to the overwritten LSB data D21*D11 and MSB data D22*D11 of the word line WL2 is determined to be a success, the recovery unit 110 may determine that a previous abnormal power-off occurred while a normal write operation was being performed to the LSB and MSB pages of the word line WL1 that is, the previous target word line and also a subsequent abnormal power-off has occurred while a copy operation was being performed to the LSB and MSB pages of the word line WL2 that is, the subsequent target word line during a recovery operation. Hence, the recovery unit 110 may determine to perform the recovery operation according to the third procedure.

At a time T803, when the overwrite operation is completed and the data D11 is stored in the respective LSB and MSB pages of the word line WL2, the recovery unit 110 may invalidate the LSB data D11 of the word lines WL1 and WL2.

As a consequence, the data D11 of the LSB page (i.e., the weak page) of the word line WL1 may be copied to the MSB page (i.e., the stable page) of the word line WL2 thereby securing the data of the weak page from a possible abnormal power-off.

Referring to FIG. 8B, according to an embodiment, at a time T813, the recovery unit 110 may additionally perform a rewrite operation to the LSB and MSB pages of the word line WL1. The rewrite operation may be performed to ensure that the LSB data D11 and MSB data D12 of the word line WL1 to which the normal write operation is interrupted due to the subsequent abnormal power-off, are written more stably.

According to an embodiment, the rewrite operation may not be performed to the LSB page of the word line WL1 which is to be finally invalidated. The rewrite operation may be performed for only a stable page to be finally retained, that is, the MSB page of the word line WL1.

The rewrite operation may be performed to the word line WL1 after performing the overwrite operation and the error correction operation to the word line WL2 and before invalidating the LSB data D11 of the word lines WL1 and WL2, for stable securement of the data D11.

Referring to FIG. 9, the recovery unit 110 may perform a recovery operation according to the fourth procedure.

In detail, at a time T901, the recovery unit 110 may determine that an error correction operation to LSB data D21 and MSB data D22 of the target word line WL2 is a failure.

Then, at a time T902, the recovery unit 110 may overwrite LSB data D11 of the word line WL1 to the LSB and MSB pages of the word line WL2. Thereafter, the recovery unit 110 may determine whether or not an error correction operation to the overwritten LSB data D21*D11 and MSB data D22*D11 of the word line WL2 is a success. If only a normal write operation is being performed to the word line WL2 when an abnormal power-off occurs, the overwrite operation may further damage the LSB data D21 and the MSB data D22 of the word line WL2. When the error correction operation to the overwritten LSB data D21*D11 and MSB data D22*D11 of the word line WL2 is determined as a failure, it may be determined that a normal write operation was being performed to the target word line at the time of the abnormal power-off. Therefore, the recovery unit 110 may determine to perform the recovery operation according to the fourth procedure.

Accordingly, at a time T903, the recovery unit 110 may invalidate the LSB data D21*D11 and the MSB data D22*D11 of the word line WL2 which are impossible to be recovered.

Figure 10:
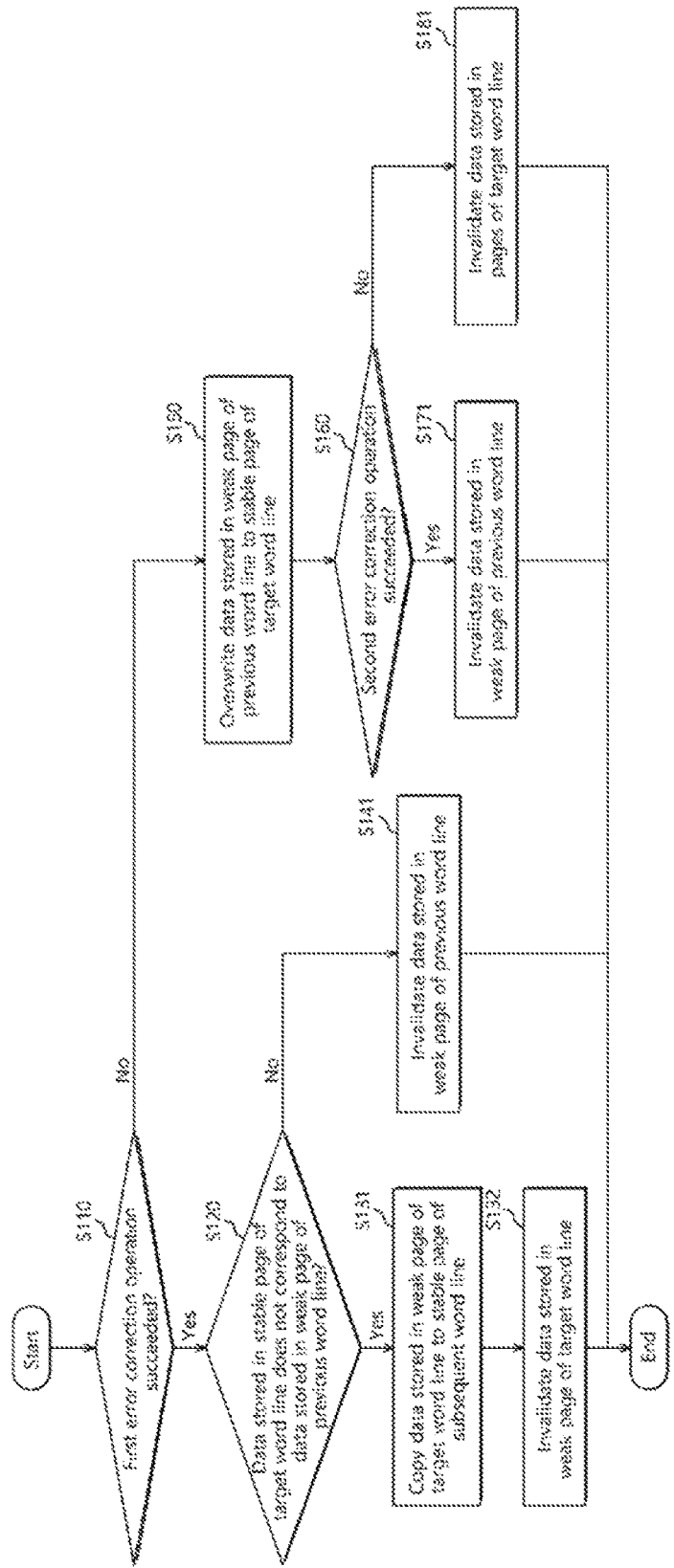
FIG. 10 is a flow chart illustrating an operation method of the data storage device of FIG. 1.

FIG. 10 is a flow chart illustrating a method for operating the data storage device 10 of FIG. 1. FIG. 10 illustrates a method for performing a recovery operation for a target word line for which a write operation is last performed when an abnormal power-off occurs.

At step S110, the recovery unit 110 may determine whether a first error correction operation for the data stored in the pages of a target word line is a success or a failure. When the first error correction operation is a success, the process may proceed to step S120. When the first error correction operation is a failure, the process may proceed to step S150.

At the step S120, the recovery unit 110 may compare the data stored in the stable page of the target word line with the data stored in the weak page of a previous word line for which a write operation was performed earlier than the target word line.

When the data stored in the stable page does not correspond to the data stored in the weak page, the process may proceed to step S131. The recovery unit 110 may determine that an abnormal power-off has occurred while a normal write operation was being performed to the target word line, and perform the recovery operation according to the first procedure.

However, when the data stored in the stable page corresponds to the data stored in the weak page, the process may proceed to step S141. The recovery unit 110 may determine that a previous abnormal power-off occurred while a normal write operation was being performed to the previous word line and also a subsequent abnormal power-off has occurred while a copy operation was being performed to the target word line during a recovery operation, and perform the recovery operation according to the second procedure.

In detail, at the step S131, the recovery unit 110 may copy the data stored in the weak page of the target word line to the stable page of a subsequent word line to which a write operation is performed next to the target word line. The recovery unit 110 may store appropriate data in the remaining pages of the subsequent word line.

At step S132, the recovery unit 110 may invalidate the data stored in the weak page of the target word line. According to an embodiment, the recovery unit 110 may also invalidate the data stored in the remaining pages of the subsequent word line excluding the stable page.

At the step S141, the recovery unit 110 may invalidate the data stored in the weak page of the previous word line. According to an embodiment, the recovery unit 110 may also invalidate the data stored in the remaining pages of the target word line excluding the stable page.

At the step S150, the recovery unit 110 may overwrite the data stored in the weak page of the previous word line into the stable page of the target word line.

At step S160, the recovery unit 110 may determine whether a second error correction operation for the data overwritten in the stable page of the target word line is a success or a failure.

When the second error correction operation is a success, the process may proceed to step S171. That is, the recovery unit 110 may determine that a previous abnormal power-off occurred while a normal write operation was being performed to the previous word line and also a subsequent abnormal power-off has occurred while a copy operation was being performed to the target word line during a recovery operation, and perform the recovery operation according to the third procedure.

When the second error correction operation is a failure, the process may proceed to step S181. That is, the recovery unit 110 may determine that an abnormal power-off has occurred while a normal write operation was being performed to the target word line and the data stored in the pages of the target word line are impossible to recover, and perform the recovery operation according to the fourth procedure.

In detail, at the step S171, the recovery unit 110 may invalidate the data stored in the weak page of the previous word line. According to an embodiment, the recovery unit 110 may also invalidate the data stored in the remaining pages of the target word line excluding the stable page.

At the step S181, the recovery unit 110 may invalidate the data stored in the pages of the target word line.

Figure 11:
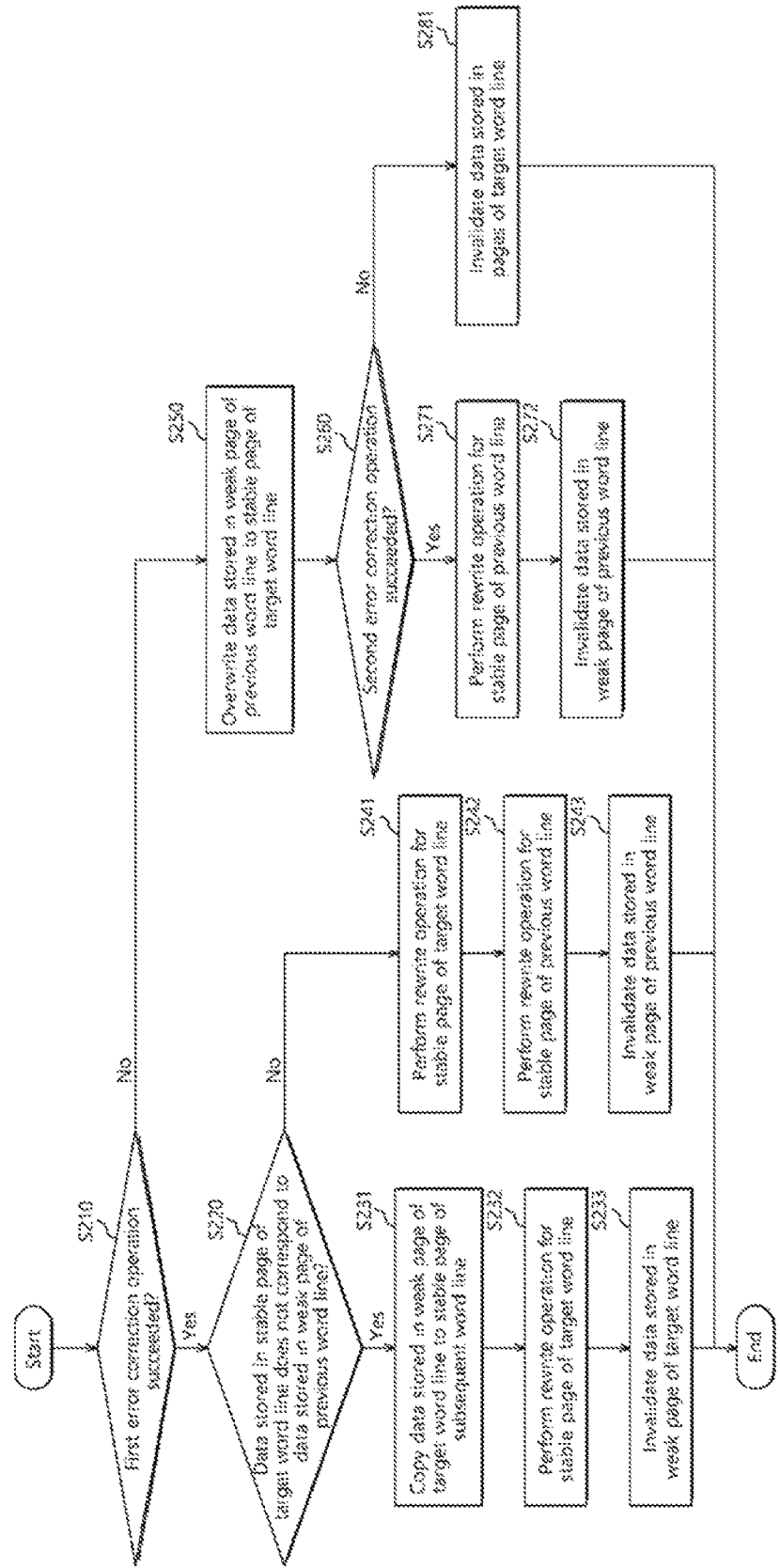
FIG. 11 is a flow chart illustrating an operation method of the data storage device of FIG. 1.

FIG. 11 is a flow chart illustrating a method for operating the data storage device 10 of FIG. 1. The recovery method of FIG. 11 may be similar to the recovery method of FIG. 10 except that rewrite operations of steps S232, S241, S242 and S271 are added.

In detail, at the step S232, the recovery unit 110 may perform a rewrite operation to the stable page of the target word line. The stable page of the target word line to which a normal write operation is interrupted due to an abnormal power-off may be further stabilized through the rewrite operation.

At the step S241, the recovery unit 110 may perform a rewrite operation to the stable page of the target word line. The stable page of the target word line to which a copy operation is interrupted due to the abnormal power-off may be further stabilized through the rewrite operation.

At the step S242, the recovery unit 110 may perform a rewrite operation to the stable page of a previous word line. The stable page of the previous word line to which a normal write operation is interrupted due to the abnormal power-off may be further stabilized through the rewrite operation.

At the step S271, the recovery unit 110 may perform a rewrite operation to the stable page of a previous word line. The stable page of the previous word line for which a normal write operation is interrupted due to the abnormal power-off may be further stabilized through the rewrite operation.

Figure 12:
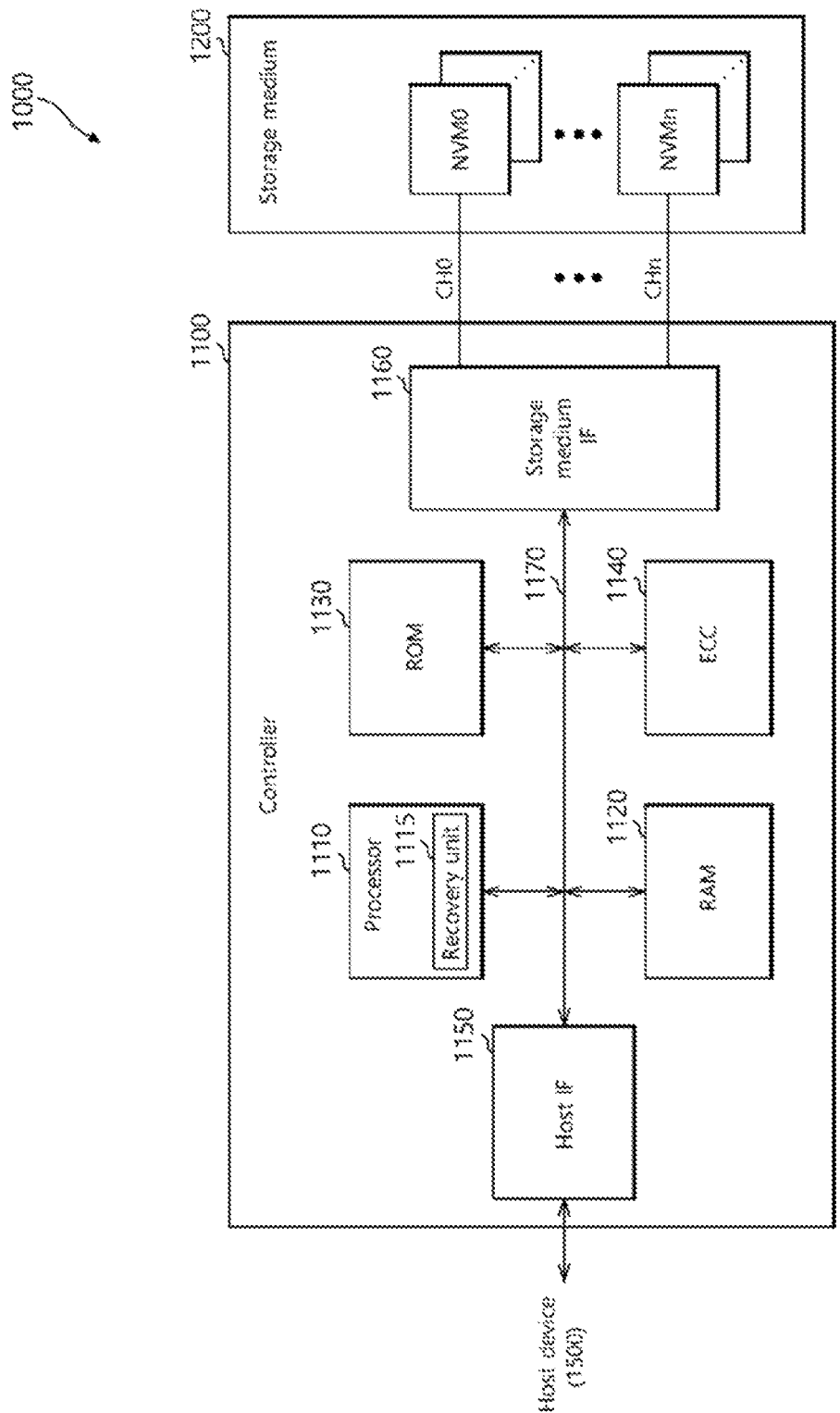
FIG. 12 is a block diagram illustrating a solid state drive (SSD) in accordance with an embodiment.

FIG. 12 is a block diagram illustrating solid state drive (SSD) 1000 in accordance with an embodiment.

The SSD 1000 may include a controller 1100 and a storage medium 1200.

The controller 1100 may control data exchange between a host device 1500 and the storage medium 1200. The controller 1100 may include a processor 1110, a RAM 1120, a ROM 1130, an ECC unit 1140, a host interface 1150 and a storage medium interface 1160 which are coupled through an internal bus 1170.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The processor 1110 may include a recovery unit 1115. The recovery unit 1115 may operate in substantially the same manner as the recovery unit 110 of FIG. 1.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error which occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may transmit data from the storage medium 1200. The storage medium interface 1160 may be coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may perform a write operation and a read operation according to control of the controller 1100.

Figure 13:
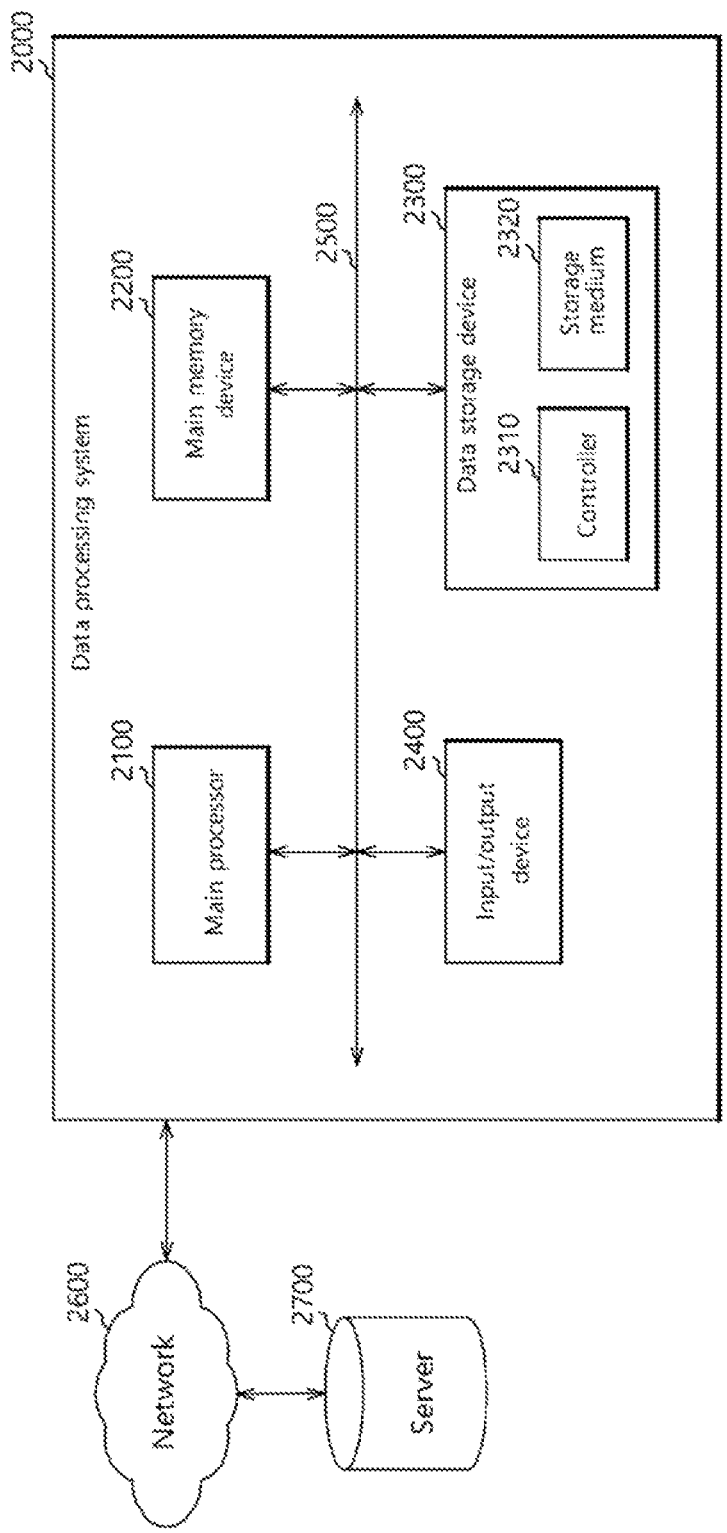
FIG. 13 is a block diagram illustrating a data processing system to which the data storage device in accordance with the embodiment is applied.

FIG. 13 is a block diagram illustrating a data processing system 2000 in which the data storage device 10 in accordance with the embodiment is applied.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, for example, such as a microprocessor. The main processor 2100 may execute software such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface (not shown) to access the network 2600.

While various embodiments have been described above, it will be understood by those skilled in the art that the embodiments described are examples only. Accordingly, the data storage device and the operating method thereof described herein should not be limited based on the described embodiments.

What is claimed is:

1. A data storage device comprising:
a nonvolatile memory device including a first page group coupled to a first word line and a second page group coupled to a second word line, which is subsequent to the first word line in order of a write operation; and
a controller suitable for, after an abnormal power-off during or after a write operation to the first page group, copying a first data stored in a weak page of the first page group to a stable page of the second page group when a first error correction operation to data stored in the first page group is a success, wherein the stable page is a different type of page than the weak page.

2. The data storage device according to claim 1,
wherein the nonvolatile memory device further includes a third page group coupled to a third word line, which is previous to the first word line in order of the write operation, and
wherein the controller copies the first data when a second data stored in a stable page of the first page group is not the same as a third data stored in a weak page of the third page group.

3. The data storage device according to claim 2, wherein the controller invalidates the third data without the copying of the first data when the second data is the same as the third data.

4. The data storage device according to claim 3, wherein, before invalidating the third data, the controller further performs a rewrite operation for each of the stable page of the first page group and a stable page of the third page group.

5. The data storage device according to claim 1,
wherein the nonvolatile memory device further includes a third page group coupled to a third word line, which is previous to the first word line in order of the write operation, and
wherein the controller further overwrites a third data stored in a weak page of the third page group to a stable page of the first word line when the first error correction operation is a failure, and invalidates the third data when a second error correction operation to data stored in the stable page of the first word line is a success.

6. The data storage device according to claim 5, wherein, before the invalidating of the third data, the controller further performs a rewrite operation to a stable page of the third page group.

7. The data storage device according to claim 5, wherein the controller further invalidates the data stored in the first page group when the second error correction operation is a failure.

8. The data storage device according to claim 1, wherein the controller further performs a rewrite operation for a stable page of the first page group after the copying of the first data, and invalidates the first data.

9. The data storage device according to claim 1, wherein the first data is read from the weak page of the first page group according to a highest read voltage among read voltages applied to the first word line.

10. A method for operating a data storage device, the method comprising:
copying a first data stored in a weak page of a first page group to a stable page of a second page group when a first error correction operation to data stored in the first page group is a success, after an abnormal power-off during or after a write operation to the first page group,
wherein the data storage device includes a nonvolatile memory device including the first page group coupled to a first word line and the second page group coupled to a second word line, which is subsequent to the first word line in order of a write operation, wherein the stable page is a different type of page than the weak page.

11. The method according to claim 10,
wherein the nonvolatile memory device further includes a third page group coupled to a third word line, which is previous to the first word line in order of the write operation, and
wherein the copying of the first data is performed when a second data stored in a stable page of the first page group is not the same as a third data stored in a weak page of the third page group.

12. The method according to claim 11, further comprising:
invalidating the third data without the copying of the first data when the second data is the same as the third data.

13. The method according to claim 12, further comprising, before the invalidating of the third data, performing a rewrite operation for each of the stable page of the first page group and a stable page of the third page group.

14. The method according to claim 10,
wherein the nonvolatile memory device further includes a third page group coupled to a third word line, which is previous to the first word line in order of the write operation, and
further comprising:
overwriting a third data stored in a weak page of the third page group to a stable page of the first word line when the first error correction operation is a failure; and
invalidating the third data when a second error correction operation to data stored in the stable page of the first word line is a success.

15. The method according to claim 14, further comprising, before the invalidating of the third data, performing a rewrite operation to a stable page of the third page group.

16. The method according to claim 14, further comprising invalidating the data stored in the first page group when the second error correction operation is a failure.

17. The method according to claim 10, further comprising:

performing a rewrite operation for a stable page of the first page group after the copying of the first data; and invalidating the first data.

18. The method according to claim 10, wherein the first data is read from the weak page of the first page group according to a highest read voltage among read voltages applied to the first word line.

19. A data storage device comprising:
- a nonvolatile memory device including a first page group coupled to a first word line, a second page group coupled to a second word line which is subsequent to the first word line in order of a write operation and a third page group coupled to a third word line which is previous to the first word line in order of the write operation; and
- a controller suitable for, after an abnormal power-off during or after a write operation to the first page group, copying a first data stored in a weak page of the first page group to a stable page of the second page group depending on whether a second data stored in a stable page of the first page group is the same as a third data stored in a weak page of the third page group, when an error correction operation to data stored in the first page group is a success.

* * * * *